Oct. 9, 1951 — C. M. HATHAWAY — 2,570,672

ACCELEROMETER UNIT

Filed Jan. 10, 1950

Inventor:
Claude M. Hathaway
By: Alois W. Graf
Attorney

Patented Oct. 9, 1951

2,570,672

UNITED STATES PATENT OFFICE 2,570,672

ACCELEROMETER UNIT

Claude M. Hathaway, Littleton, Colo.

Application January 10, 1950, Serial No. 137,840

5 Claims. (Cl. 171—119)

The present invention relates to accelerometers and more particularly to a compact relatively accurate accelerometer unit particularly suited for electrical recording of high velocities.

In the operation of aircraft and jet propelled craft and missiles, it is desired to provide a record of the acceleration in order to analyze the operating characteristics and performance of each device. In making such records, the accelerometer must be capable of withstanding severe strains due to high accelerations and velocities and yet must provide reliable and accurate indication.

For recording acceleration, it is highly desirable to provide an arrangement which will directly produce an electrical quantity without the necessity of translation from a mechanical movement into an electrical quantity.

In accordance with the present invention, an improved accelerometer is provided having a plurality of magnetic coils so arranged that acceleration operating upon a seismic mass or weight will increase or decrease the impedance of coils to produce an electrical change which can be translated into an indication. In addition to a rugged and accurate structure, means must also be provided to produce the necessary damping action to avoid spurious indications.

It is, therefore, the object of the present invention to provide an improved accelerometer unit for electrically producing an indication or record of acceleration and deceleration of bodies moving at relatively high velocities.

It is a further object of the present invention to provide an accelerometer unit which has a high degree of accuracy and yet is economical to manufacture.

A still further object of the present invention is to provide an improved accelerometer unit having a convenient and simple arrangement for adjusting the unit during its manufacture.

Other and further objects of the present invention subsequently will become apparent by reference to the following description taken in conjunction with the accompanying drawing wherein.

Figure 1:
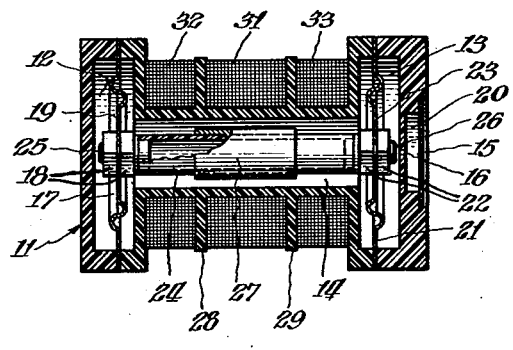
Fig. 1 is a cross sectional view of an accelerometer unit constructed in accordance with the teaching of the present invention.
Figure 2:
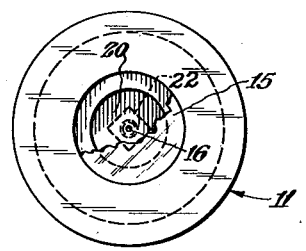
Figure 2 is an end view of the unit shown in Figure 1 with one element thereof partially broken away.

Referring to Figures 1 and 2, it is to be noted that the accelerometer unit has a casing 11 which has a spool-like cross sectional configuration. The casing 11 embodies a relatively large chamber 12 and 13 at the ends of the casing which chambers are interconnected by a cylindrical elongated passage 14. Adjacent one end an expansion chamber 20 is provided which has one wall 15 formed of a synthetic elastic material. The expansion chamber 20 is connected to the other chambers by relatively small aperture 16.

The chamber 12 is divided into two compartments by a diaphragm 17 which has a central threaded aperture formed by a nut 18. The diaphragm 17 has a relatively small aperture 19 which serves as a passage communicating between the two compartments of chamber 12 to permit damping fluid to flow from one compartment to the other.

The chamber 13 is divided into two compartments by a similar diaphragm 21 having a threaded nut 22 at a center and also being provided with a relatively small aperture 23 to permit damping fluid to flow from one compartment to the other. Extending between the diaphragms 17 and 21 is a tubular or cylindrical member 24 which is preferably formed of a non-magnetic material and may be one of the plastic materials. Each end of the member 24 is provided with a threaded portion such as the threaded members 25 and 26 which fit into the threaded apertures or nuts 18 and 22. The middle portion of the cylindrical member 24 is provided with a magnetic sleeve 27 which is centered relative to the coils surrounding the central passage 14. When the member 27 is properly centered by adjustment, the adjustment may be retained by the application of a small quantity of solder to the threaded ends 25 and 26 of the member 24.

It will be noted that extending radially from the walls of the cylindrical passage 14 are partitions 28 and 29 so as to provide suitable boundaries for a plurality of coils 31, 32, and 33.

Figure 3:
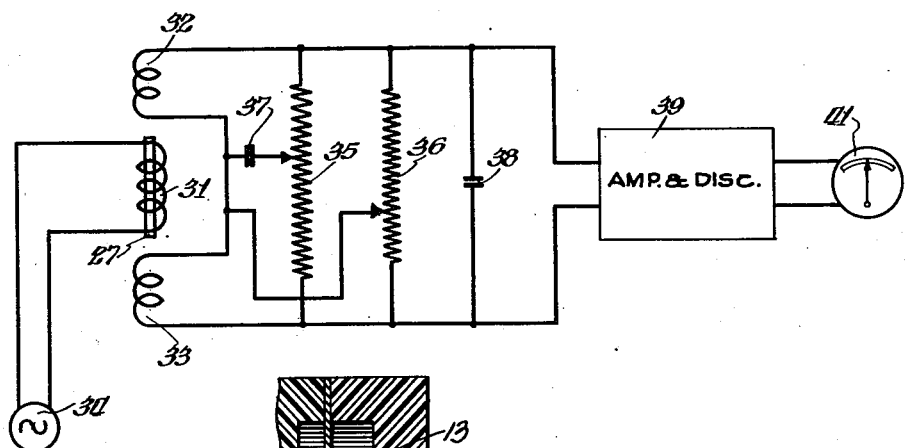
Figure 3 is an electrical circuit diagram illustrating the manner in which the unit in Figure 1 is employed to produce an indication.
Figure 4:
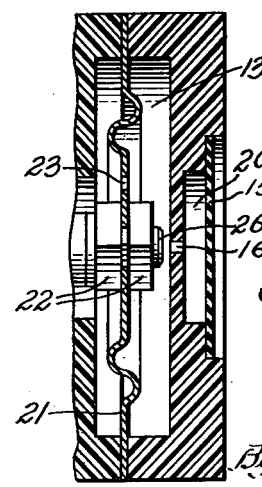
Figure 4 is a view as seen in the direction of the arrows along the line 4—4 of Figure 1.

As may be seen from Figure 3, the central coil 31 is arranged to be energized from a suitable source of alternating current 34 which is of carrier frequency of several thousand cycles per second. The coils 32 and 33 are connected in series and across a plurality of voltage dividers 35 and 36. The common juncture between the coils 32 and 33 in the one case is connected through a capacitor 37 to the movable contact of the voltage divider 35. In the other case, the movable contact and the voltage divider 36 is connected directly to the juncture of the two coils 32 and 33. A by-pass capacitor 38 is connected across the voltage dividers 35 and 36. The voltage dividers 35 and 36 are connected to the input of an amplifier and discriminator 39 which corresponds generally to the circuit arrangement disclosed in Hathaway Patent No. 2,421,420 or to the one disclosed in Hathaway Patent No. 2,445,880. To the output of the amplifier and discriminator is connected a visual indicator or meter 41 which preferably is of the zero center type so that an indication may be had of the magnitude and direction of movement of the magnetic core 27 depending upon acceleration or deceleration being present.

The adjustable contacts provided for the voltage dividers 35 and 36 are arranged to provide phase compensation so that accurate voltages are supplied to the amplifier and discriminator 39 to produce a correct indication at all times.

While for the purpose of illustrating and describing the present invention a preferred embodiment has been shown in the drawing, it is to be understood that such variations in the components employed and circuit elements utilized are contemplated as may be commensurate with the spirit and scope of the invention defined in the accompanying claims.

I claim:

1. An accelerometer comprising a housing formed as a spool having thereon a plurality of electromagnetic windings, a chamber formed at each end of said spool, a plurality of diaphragms each mounted to divide each chamber, each diaphragm having a relatively small aperture therein, a movable magnetic armature mounted in the spool passage interconnecting said chambers, means for adjustably securing said armature to said diaphragm, and a damping fluid filling said chambers and said interconnecting passage.

2. An accelerometer comprising a housing formed as a spool having thereon a plurality of electromagnetic windings, a chamber formed at each end of said spool, a passage interconnecting said chambers, a plurality of diaphragms each mounted to divide each chamber into compartments, each diaphragm having a relatively small aperture therein to interconnect said compartments, a movable magnetic armature mounted within the passage interconnecting said chambers, means for adjustably securing said armatures to said diaphragms, an expansion chamber formed in one end of said spool, a relatively small passage interconnecting said expansion chamber with said first chambers, and a diaphragm for said expansion chamber formed of synthetic elastic material.

3. An accelerometer comprising a housing having two large chambers spaced apart and interconnected by an elongated passage, a plurality of electromagnetic windings surrounding said passage, a plurality of diaphragms each having a central threaded aperture and being mounted to divide each chamber into compartments, each diaphragm having a relatively small aperture therein to interconnect said compartments, a movable magnetic armature having threaded ends mounted within said passage, and engaging the threaded apertures of said diaphragms, and an expansion chamber interconnected with said other chambers and said passage by a relatively small aperture.

4. An accelerometer comprising a housing having two large chambers at each end interconnected by an elongated cylindrical passage, a plurality of electromagnetic windings mounted on the exterior of said housing and surrounding said passage, a plurality of diaphragms each having a central threaded aperture and being mounted to divide each chamber into compartments, each diaphragm having a relatively small damping aperture therein, and a movable magnetic tube having threaded ends in engagement with the threaded apertures of said diaphragms and carrying at the middle a magnetic sleeve.

5. An accelerometer comprising a housing having two large chambers at each end interconnected by an elongated cylindrical passage, a plurality of electromagnetic windings mounted on the exterior of said housing and surrounding said passage, a plurality of diaphragms each having a central threaded aperture and being mounted to divide each chamber into compartments, each diaphragm having a relatively small damping aperture therein, and a movable magnetic tube having threaded ends in engagement with the threaded apertures of said diaphragms and carrying at the middle a magnetic sleeve, and an expansion chamber formed in one end of said housing interconnected by a relatively small passage to said first chambers, and a diaphragm for said expansion chamber formed of synthetic elastic material having one surface exposed to the atmosphere.

CLAUDE M. HATHAWAY.

REFERENCES CITED

The following references are of record in the file of this patent:

UNITED STATES PATENTS

| Number | Name | Date |
|---|---|---|
| 2,427,866 | Macgeorge | Sept. 23, 1947 |
| 2,430,757 | Conrad et al. | Nov. 11, 1947 |
| 2,507,344 | Macgeorge | May 9, 1950 |